US008681408B2

(12) United States Patent
Mochizuki

(10) Patent No.: US 8,681,408 B2
(45) Date of Patent: Mar. 25, 2014

(54) OPTICAL SCANNING DEVICE, IMAGE FORMING APPARATUS, AND IMAGE PROJECTION DEVICE

(75) Inventor: Eiji Mochizuki, Machida (JP)

(73) Assignee: Ricoh Company, Limited, Tokyo (JP)

(*) Notice: Subject to any disclaimer, the term of this patent is extended or adjusted under 35 U.S.C. 154(b) by 345 days.

(21) Appl. No.: 12/888,814

(22) Filed: Sep. 23, 2010

(65) Prior Publication Data

US 2011/0085220 A1 Apr. 14, 2011

(30) Foreign Application Priority Data

Oct. 8, 2009 (JP) ................................. 2009-234219
Aug. 5, 2010 (JP) ................................. 2010-176119

(51) Int. Cl.
*G02B 26/08* (2006.01)
*G02B 26/10* (2006.01)
*G02B 26/12* (2006.01)

(52) U.S. Cl.
USPC ...................... 359/221.2; 359/198.1; 359/904

(58) Field of Classification Search
USPC .......... 359/198.1–199.4, 200.6–200.8, 202.1,
359/212.2, 223.1–225.1, 226.2, 290–295,
359/838, 846, 871, 872, 904, 221.2;
250/204, 559.06, 559.29, 230, 234;
347/255–260; 353/39, 98–99;
385/15–18, 22; 398/12, 19, 45
See application file for complete search history.

(56) References Cited

U.S. PATENT DOCUMENTS

| | | | | |
|---|---|---|---|---|
| 5,687,020 A | * | 11/1997 | Park et al. | 359/309 |
| 2005/0093968 A1 | * | 5/2005 | Iwamoto | 347/238 |
| 2005/0243396 A1 | * | 11/2005 | Fujii et al. | 359/224 |
| 2008/0055689 A1 | * | 3/2008 | Mochizuki | 359/199 |
| 2008/0225363 A1 | * | 9/2008 | Saitoh et al. | 359/199 |
| 2009/0180167 A1 | * | 7/2009 | Tani et al. | 359/198.1 |
| 2009/0225384 A1 | * | 9/2009 | Eiji et al. | 359/199.1 |
| 2010/0232833 A1 | | 9/2010 | Fujii et al. | |

FOREIGN PATENT DOCUMENTS

| | | |
|---|---|---|
| JP | 2924200 | 5/1999 |
| JP | 3011144 | 12/1999 |
| JP | 2009-214231 | 9/2009 |
| JP | 2009-222900 | 10/2009 |

* cited by examiner

*Primary Examiner* — Stephone B Allen
*Assistant Examiner* — Kimberly N Kakalec
(74) *Attorney, Agent, or Firm* — Oblon, Spivak, McClelland, Maier & Neustadt, L.L.P.

(57) ABSTRACT

An optical scanning device includes a substrate, a frame, a torsion beam, and a cantilever. The substrate has a three-layer structure including an oxide film sandwiched between two silicon substrates. The torsion beam swingably supports a mirror portion which deflects a light beam projected from a light source. The cantilever is supported by the frame to connect to the torsion beam and applies torque to the torsion beam. The cantilever and the torsion beam are formed on the same silicon substrate. The cantilever has a thickness substantially thinner than the thickness of the torsion beam. An image forming apparatus includes the optical scanning device. An image projection device includes the optical scanning device.

6 Claims, 13 Drawing Sheets

FIG. 1
(1)
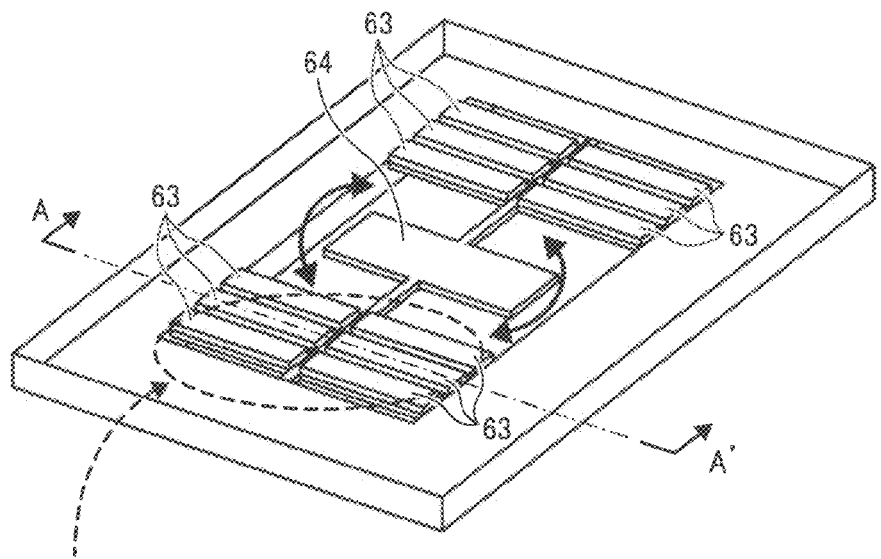
(2) A-A'
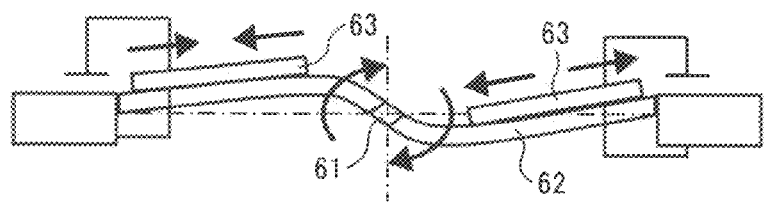
FIG. 2
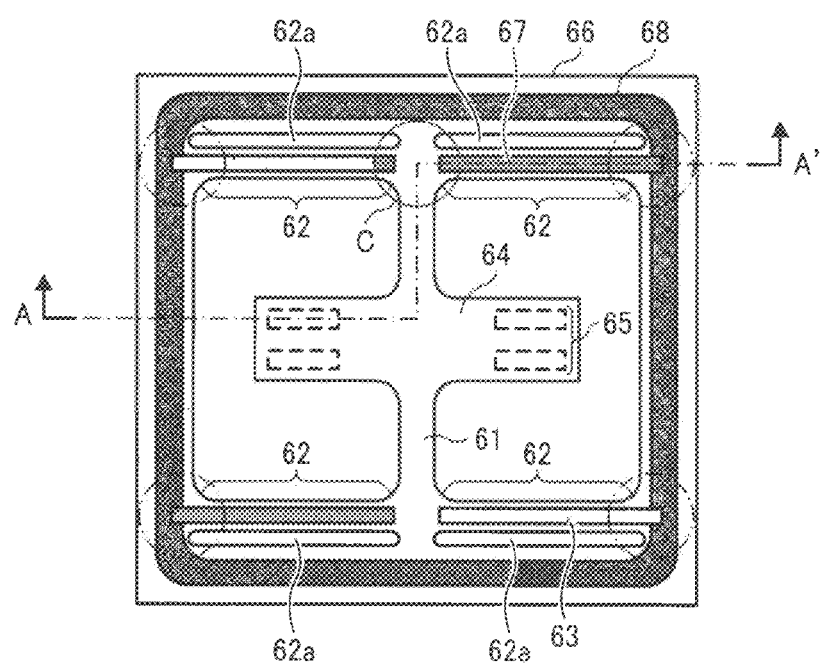

FIG. 7
PZT PROCESS
(1) 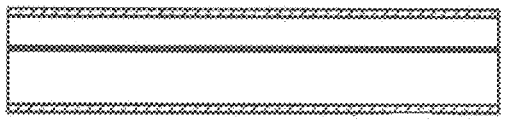
FORM THERMAL OXIDE FILM (0.5μm)
ON SILICON-ON-INSULATOR (SOI)
WAFER (100/0.5/300μm)
(2) 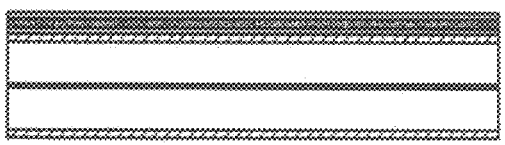
FILM FORMATION
LOWER ELECTRODE
(Pt/Ti: 1500A/500A)
PZT (3-5μm)
UPPER ELECTRODE (PT: 1500A)
(3) 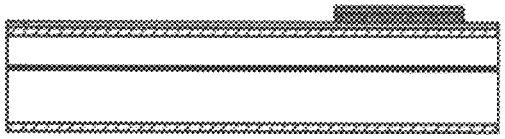
UPPER ELECTRODE ETCHING (RIE),
PZT ETCHING (RIE)
(4) 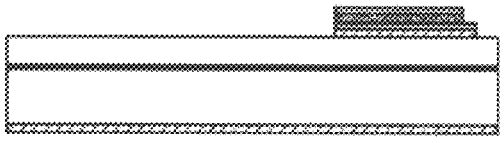
LOWER ELECTRODE ETCHING (RIE),
THERMAL OXIDE FILM ETCHING (RIE)
(5) 
FORM REFLECTIVE COAT
(Au/Pt/Ti: 1000A/500A/500A)
BY LIFT-OFF

FIG. 8A

SOI PROCESS (1) REMOVE OXIDE FILM
FORM Al FILM (0.3 μm)

(2) FORM RESIST MASK ON PZT SURFACE
1st PHOTOLITHOGRAPHY
(O/S TORSION BEAM, RIB, AND CANTILEVER)
Al ETCHING (3) REMOVE RESIST
2nd PHOTOLITHOGRAPHY
(TORSION BEAM, REFLECTIVE COAT, AND SIDES OF CANTILEVER)

(4) 1st SILICON ETCHING
(100 μm)

FIG. 8C
(9) 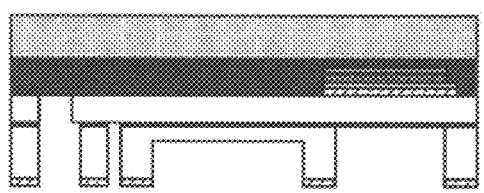
1st SiO2 ETCHING (REMOVE BURIED OXIDE (BOX))
(10) 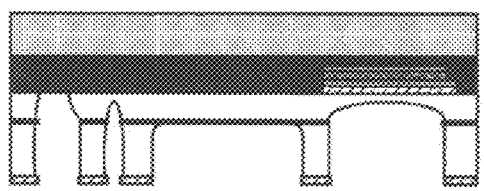
4th SILICON ETCHING (70 μm)
(11) 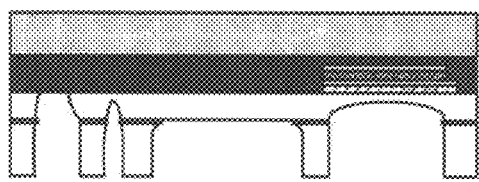
AL ETCHING
2nd SiO2 ETCHING (REMOVE BURIED OXIDE (BOX))
(12) 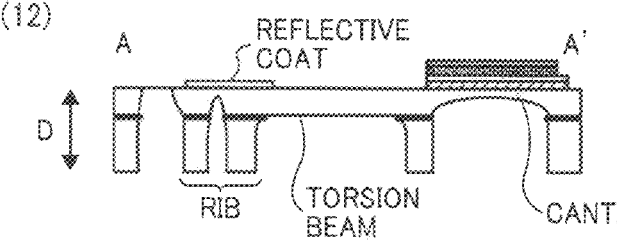
SEPARATE SUPPORT WAFER
O2 ASHING FIG. 10
(a)
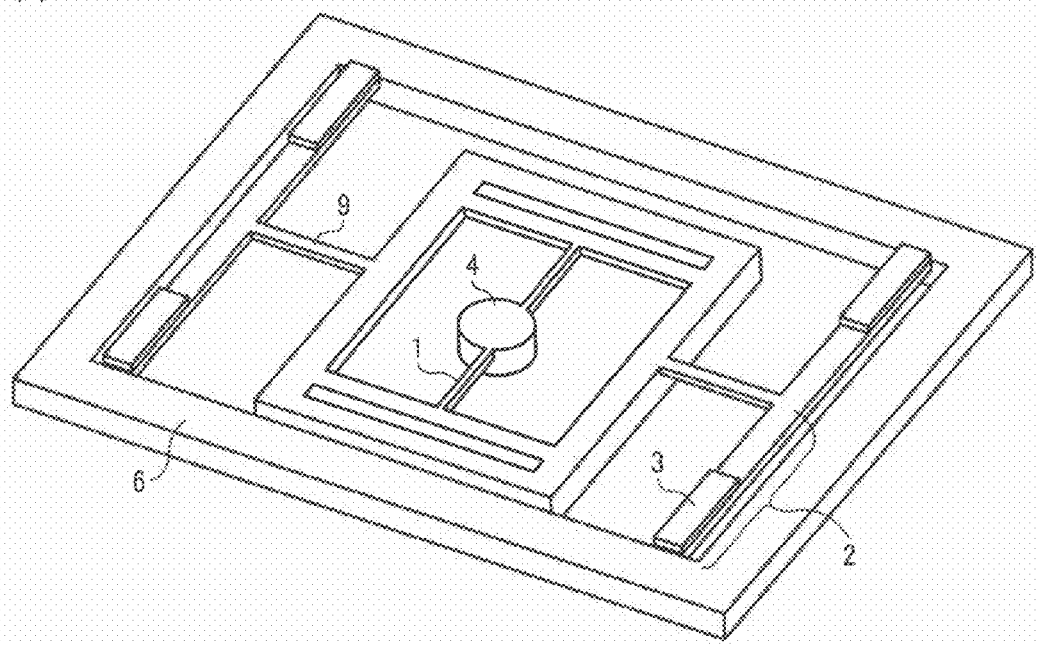
(b)
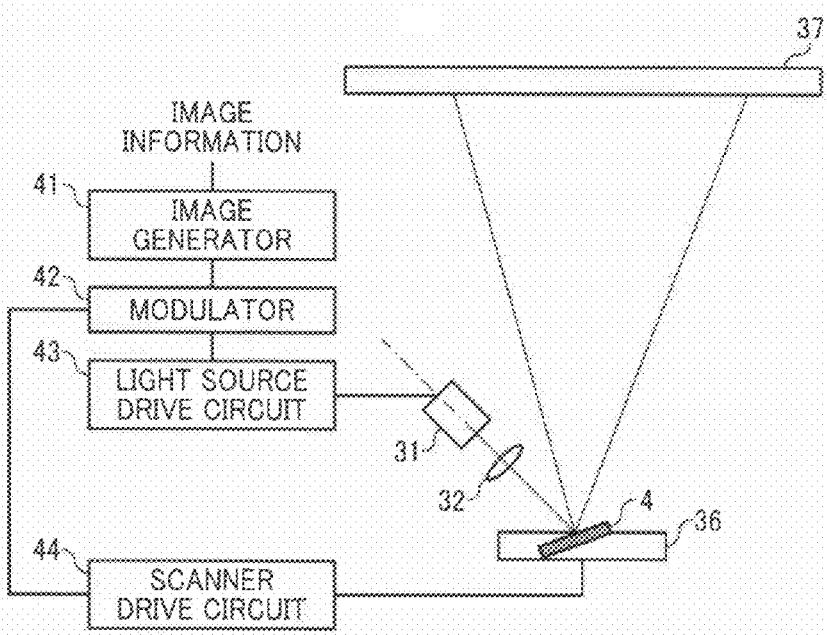

OPTICAL SCANNING DEVICE, IMAGE FORMING APPARATUS, AND IMAGE PROJECTION DEVICE

CROSS-REFERENCE TO RELATED APPLICATIONS

This patent application is based on and claims priority pursuant to 35 U.S.C. §119 from Japanese Patent Application Nos. 2009-234219, filed on Oct. 8, 2009, and 2010-176119, filed on Aug. 5, 2010, both in the Japan Patent Office, which are hereby incorporated herein by reference in their entirety.

BACKGROUND OF THE INVENTION

1. Field of the Invention

Exemplary aspects of the present invention generally relate to an optical scanning device including a cantilever, and an image forming apparatus or an image projection device employing the optical scanning device.

2. Description of the Background Art

Conventionally, an optical scanning device employed in image projection devices and image forming apparatuses such as digital copiers and laser printers, utilizes a deflector such as a polygon mirror or a galvanometer mirror to scan a light beam projected from a light source. In order to achieve a high-resolution image and high-speed operation, typically, high operational speed and a relatively large swing angle of those mirrors are of critical importance.

In view of the above, much research has been conducted on an optical deflector using silicon micromachining in recent years. For example, Japanese Patent Nos. 2924200 and 3011144 propose an optical deflector in which an oscillation mirror and a torsion beam supporting the mirror constitute a single integrated unit on a silicon (Si) substrate.

Although an optical scanning device using such an oscillation mirror is advantageous in that it consumes less power when compared with the optical scanning device using the polygon mirror, a large swing angle at high speed is required of the mirror. In order to obtain a large swing angle of the mirror, it is necessary to swing widely the cantilever that provides torsional torque to the torsion beam. As a result, the cantilever may break or be damaged when swung widely.

Etching is one example of a method for fabricating a cantilever having good mechanical strength and thus difficult to break. In this method, the cantilever is deliberately made to have a thickness distribution that is uneven in a depth direction. That is, a fixed end of the cantilever is made thicker, thereby reducing concentration of stress and thus preventing destruction of the cantilever. Such a processing method is known to be effective in the field of Micro Electro Mechanical System (MEMS) when fabricating the cantilever on the silicon substrate.

However, there is a drawback to this method. When forming an optical scanning device using a single sheet of the silicon substrate, the amount of etching needed for fabrication of the torsion beam and the cantilever increases, resulting in irregular thickness of the substrate due to etching. In particular, the irregular thickness of the torsion beam generates irregular vibration, thus resulting in irregular resonance frequency. When the irregularity of the resonance frequency becomes significant, it complicates drive control, thereby complicating design of the drive circuit and increasing its cost.

In view of the above, there is demand for a cantilever that is physically strong to withstand torsional rotation while providing a large swing angle and suppressing irregular resonance frequency.

SUMMARY OF THE INVENTION

In view of the foregoing, in one illustrative embodiment of the present invention, an optical scanning device includes a substrate having a three-layer structure including an oxide film sandwiched between two silicon substrates, a frame, a torsion beam, and a cantilever. The torsion beam swingably supports a mirror portion which deflects a light beam projected from a light source. The cantilever is supported by the frame to connect to the torsion beam and applies torque to the torsion beam. The cantilever and the torsion beam are formed on the same silicon substrate. The cantilever has a thickness substantially thinner than the thickness of the torsion beam.

In another illustrative embodiment of the present invention, an image forming apparatus includes an optical scanning device, an image bearing member, a developing device, and a transfer device. The optical scanning device includes a substrate having a three-layer structure including an oxide film sandwiched between two silicon substrates, a frame, a torsion beam, and a cantilever. The torsion beam swingably supports a mirror portion which deflects a light beam projected from a light source. The cantilever is supported by the frame to connect to the torsion beam and applies torque to the torsion beam. The cantilever and the torsion beam are formed on the same silicon substrate. The cantilever has a thickness substantially thinner than the thickness of the torsion beam. The image bearing member is scanned by the optical scanning device to form an electrostatic latent image on a surface of the image bearing member. The developing device develops the electrostatic latent image with toner to form the electrostatic latent image into a toner image also known as a visible image. The transfer device transfers the toner image onto a recording medium.

In yet another illustrative embodiment of the present invention, an image projection device for projecting an image against a projection surface includes a light source to project light, an collimating optical system, a modulator, and an optical scanning device. The light source projects light. The collimating optical system forms diffused light projected from the light source into substantially parallel light. The modulator modulates the light projected from the light source in accordance with an image signal. The optical scanning device includes a substrate having a three-layer structure including an oxide film sandwiched between two silicon substrates, a frame, a torsion beam, and a cantilever. The torsion beam swingably supports a mirror portion which deflects a light beam projected from a light source. The cantilever is supported by the frame to connect to the torsion beam and applies torque to the torsion beam. The cantilever and the torsion beam are formed on the same silicon substrate. The cantilever has a thickness substantially thinner than the thickness of the torsion beam.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 1 is a schematic diagram illustrating the operating principle of a known lead zirconate titanate (PZT)-actuated scanner;

FIG. 2 is a schematic diagram illustrating a standard PZT microscanner;

FIGS. 7(1) through (5) are schematic diagrams illustrating steps of a PZT process, according to a first illustrative embodiment of the present invention;

FIGS. 8A through 8C are schematic diagrams illustrating steps of an SOI process according to a first illustrative embodiment of the present invention;

FIG. 10(a) is a schematic diagram illustrating a two-axis microscanner according to another illustrative embodiment of the present invention;

FIG. 10(b) is a conceptual diagram illustrating an image projection device employing the two-axis microscanner of FIG. 10(a)

DETAILED DESCRIPTION OF ILLUSTRATIVE EMBODIMENTS

Figure 3:
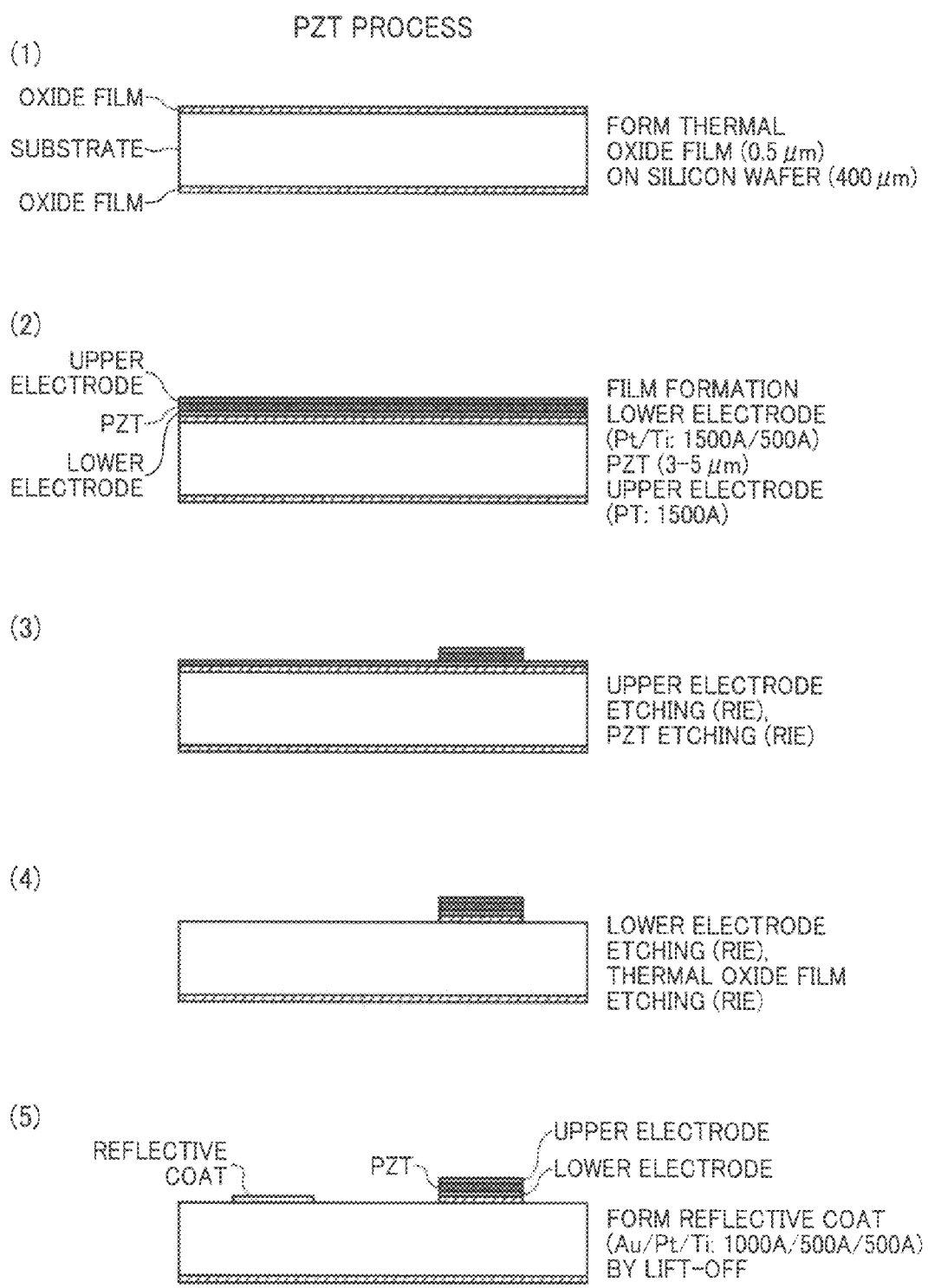
FIGS. 3(1) through 3(5) are cross-sectional schematic diagrams illustrating conventional steps of fabrication of the PZT taken along a broken line A-A' of FIG. 2.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, examples and exemplary embodiments of this disclosure are described.

A description is provided of a configuration and a manufacturing method of a cantilever and an optical scanning device using the cantilever according to the illustrative embodiment of the present invention. First, a description is provided of a general structure of a lead zirconate titanate (PZT)-actuated microscanner.

Referring now to FIG. 1(1), there is provided a schematic diagram illustrating the operating principle of a known PZT-driven type microscanner. FIG. 1(2) is a schematic diagram illustrating a cross section A-A' of the microscanner shown in FIG. 1(1). Arrows show movement of a torsion beam 61 and a cantilever 62.

When applied with an alternate current (AC) field, PZT films 63, which are piezoelectric elements formed on the cantilever 62, expand and contract in an inplane direction, thereby oscillating the cantilever 62. The PZT films 63 serve as actuators. Due to vibration of the cantilever 62, torsional torque is exerted to the torsion beam 61, generating a rotary force.

Subsequently, as the torsion beam 61 oscillates, a mirror portion 64 including a reflective coat connected thereto oscillates, thereby deflecting a light beam. For this reason, in order for the mirror portion 64 to obtain a large swing angle, it is necessary to oscillate the cantilever 62 widely.

In order to facilitate an understanding of the related art and of the novel features of the present invention, with reference to FIGS. 2 through 6, a description is now provided of a related-art PZT microscanner.

FIG. 2 is a top schematic view of a standard PZT microscanner. In FIG. 2, the PZT microscanner includes the torsion beam 61, the cantilever 62 that connects the torsion beam 61 to a frame 66 which is relatively stiff, and the PZT films 63 including an upper electrode. "62a" refers to sides of the cantilever 62. Upper pad electrodes 67 are provided at places indicated by broken-line circles on the frame 66. A lower pad electrode 68 formed on the frame 66 is a common electrode. The position of the lower pad electrode 68 is not limited to the place shown in FIG. 2. The lower pad electrode 68 may be formed anywhere on the frame 66.

The pad electrodes are electrically connected to a drive circuit, not illustrated, by bonding a flexible printed circuit (hereinafter as FPC) using an anisotropic conductive film (hereinafter ACF) and wire bonding. Energized by the electrodes, the cantilever 62 is curved, causing the mirror portion 64 to oscillate through the torsion beam 61.

The mirror portion 64 deflects/reflects the laser beam by oscillating about the torsion beam 61 as an axis of rotation. A rib 65 maintains the rigidity of the mirror portion 64 while achieving reduction in weight, enhancing responsivity of vibration of the mirror portion 64, and preventing undesirable deformation during oscillation.

Figure 4:
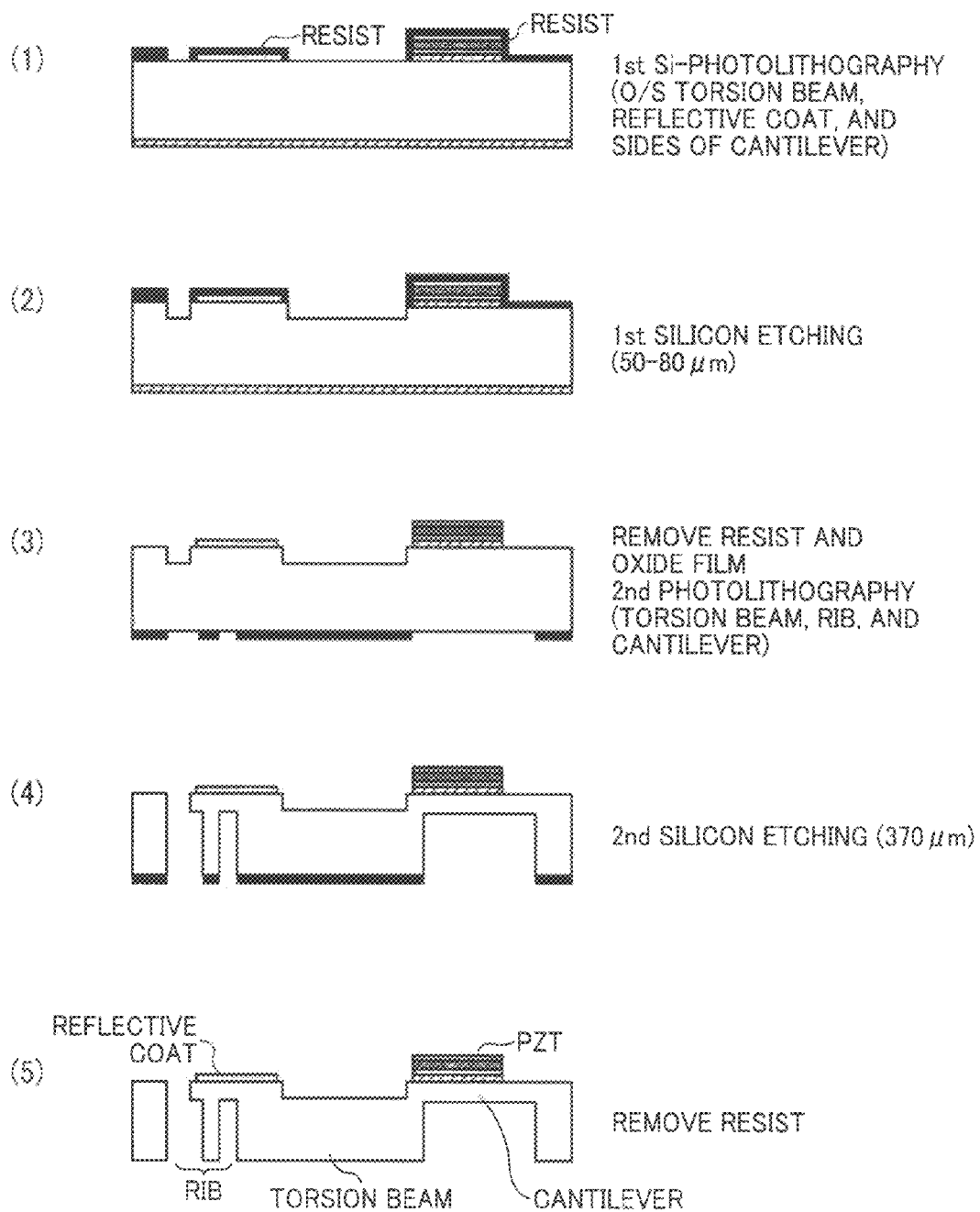
FIGS. 4(1) through (5) are cross-sectional schematic diagrams taken along a broken line A-A' of FIG. 2, illustrating steps of a silicon process for fabrication of a microscanner using a silicon substrate as a first conventional example.

Next, with reference to FIGS. 3 and 4, a description is provided of a known method of fabrication of the PZT microscanner. FIGS. 3(1) through (5) are cross sectional schematic diagrams along a line A-A' of FIG. 2, illustrating steps of a PZT process. FIGS. 4(1) through (5) are cross sectional schematic diagrams along the line A-A' of FIG. 2, illustrating steps of a silicon process for fabrication of a first conventional microscanner.

As illustrated in FIG. 3(1), in the PZT process, a thermal oxide film with a thickness of 0.5 μm for insulation is formed on a substrate (silicon (Si) wafer) with 400 μm in thickness. Next, as shown in FIG. 3(2), layers including the lower electrode (Pt/Ti: 1500 A/500 A), the PZT (3-5 μm), and the upper electrode (Pt: 1500 A) are formed in series on the thermal oxide film. The lower electrode consists of, for example, a Titanium (Ti) layer with a thickness of 0.05 μm and a platinum (Pt) layer with a thickness of 0.15 μm. The thickness of the PZT is 3 μm. The upper electrode is made of a Pt layer with a thickness of 0.15 μm.

Sputtering, for example, is used for film formation of the lower and the upper electrodes. The PZT is formed using the sputtering method, a chemical vapor deposition (CVD) method, ion plating, and so forth.

Subsequently, as shown in FIG. 3(3), after the photolithography process, the upper electrode and the PZT are formed by a dry etching process, particularly, reactive ion etching (RIE). In FIG. 3(4), after the photolithography process takes place, the lower electrode and the thermal oxide film are formed by RIE. In FIG. 3(5), a reflective coat is fabricated on the substrate using a lift-off process. The reflective coat is made of, for example, a Ti layer with a thickness of 0.05 μm, a Pt layer with a thickness of 0.05 μm, and an Au layer with a thickness of 0.1 μm.

Referring now to FIG. 4(1) through (5), a description is now provided of a silicon process using a silicon (Si) substrate.

In the silicon process, after the photolithography process (1st photolithography process) as illustrated in FIG. 4(1), a first silicon etching (50-80 μm) is performed as illustrated in FIG. 4(2). In FIG. 4(1), "O/S TORSIONAL BEAM" refers to a mask pattern that is oversized or larger than the pattern of the torsion beam. "SIDES OF CANTILEVER" are shown in FIG. 2 or shown in FIG. 6A(3).

After the photolithography process (2nd photolithography process) is performed on the other side of the substrate as illustrated in FIG. 4(3) and the resist and the oxide film are removed, a second silicon etching (370 μm) is performed as illustrated in FIG. 4(4). Lastly, as illustrated in FIG. 4(5), the resist is removed, and the microscanner having the cantilever with a thickness of 30 μm is fabricated.

Unfortunately, there is a drawback in such a configuration that stress is concentrated at a connecting portion between the cantilever and the torsion beam, causing destruction of the cantilever if there is a problem with etching such as a notch. Even when there is no defect in etching, but when shaken hard, the cantilever may break easily.

Figure 5:
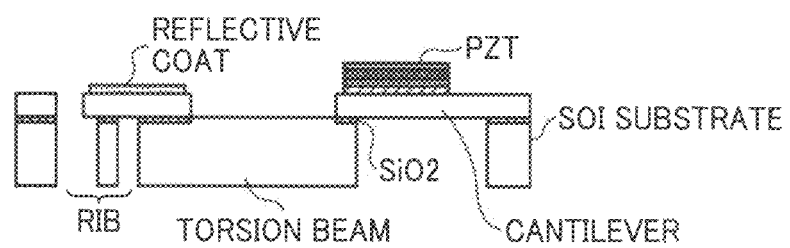
FIG. 5 is a schematic cross-sectional diagram illustrating a silicon-on-insulator (SOI) microscanner using an SOI substrate as a second conventional example.

Referring now to FIG. 5, there is provided a schematic cross sectional diagram illustrating a silicon-on-insulator (SOI) microscanner using an SOI substrate as a second conventional example. This manufacturing process uses a similar, if not the same technique as explained in FIGS. 4(1) through (5).

The SOI substrate is advantageous in that the shape of the torsion beam and the cantilever, in particular, the thickness thereof, can be fabricated with precision. Disadvantageously, however, when the torsion beam and the cantilever are connected through a dissimilar material (here, SiO2, for example), when stress is concentrated, the torsion beam and the cantilever may separate easily from one another at the connecting portion.

Causes of destruction of the cantilever include, but are not limited to, various stress and a combination of different effects. For example, tensile stress is one of the causes of destruction of the cantilever. The tensile stress is generated at the end portion of the cantilever 62. Referring back to FIG. 2, the shape of the connecting portion between the cantilever 62 and the mirror portion 64 indicated by a circle C has a curved shape so that the concentration of stress is reduced. The curved shape is easily formed using the photolithographic pattern.

It is more effective to have a thickness distribution in the thickness direction of the cantilever 62. The most preferable is a curve in the thickness direction at the end of the cantilever 62 (the connecting portion with the torsion beam 62 or the like).

Figure 6A:
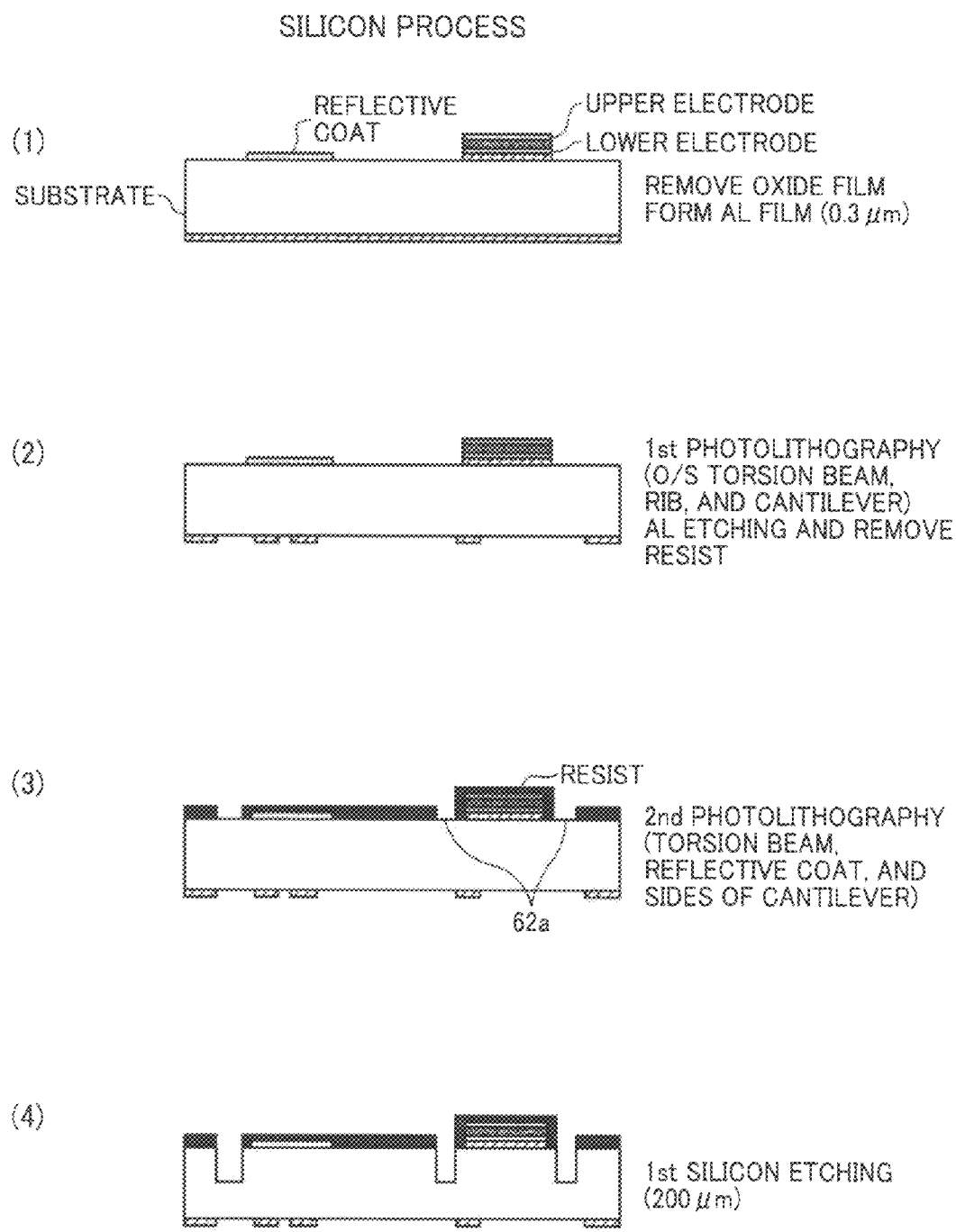
FIGS. 6A and 6B are cross-sectional schematic diagrams illustrating steps of a silicon process when using a single silicon substrate as a third conventional example.
Figure 6B:
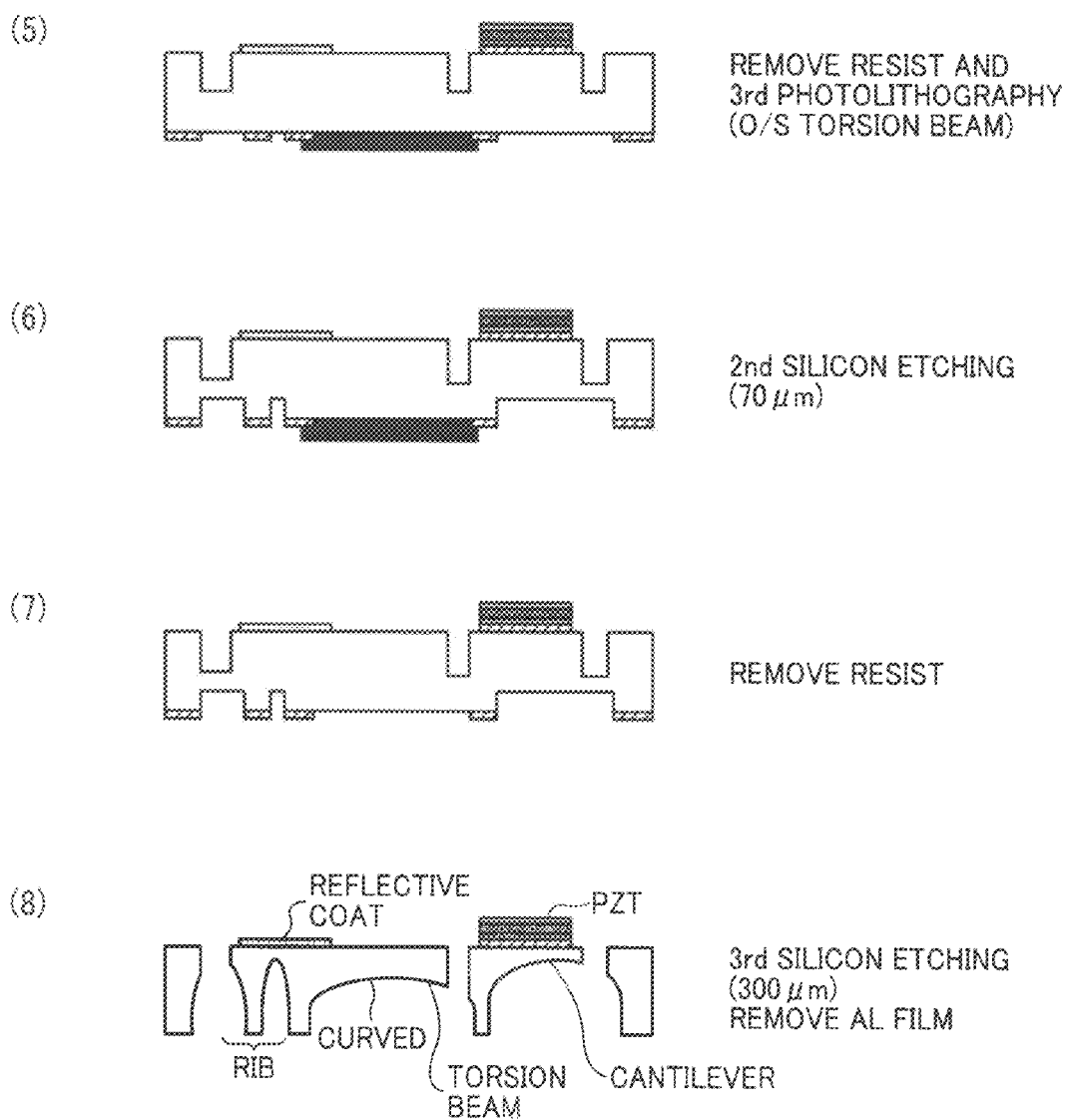
Figure 11:
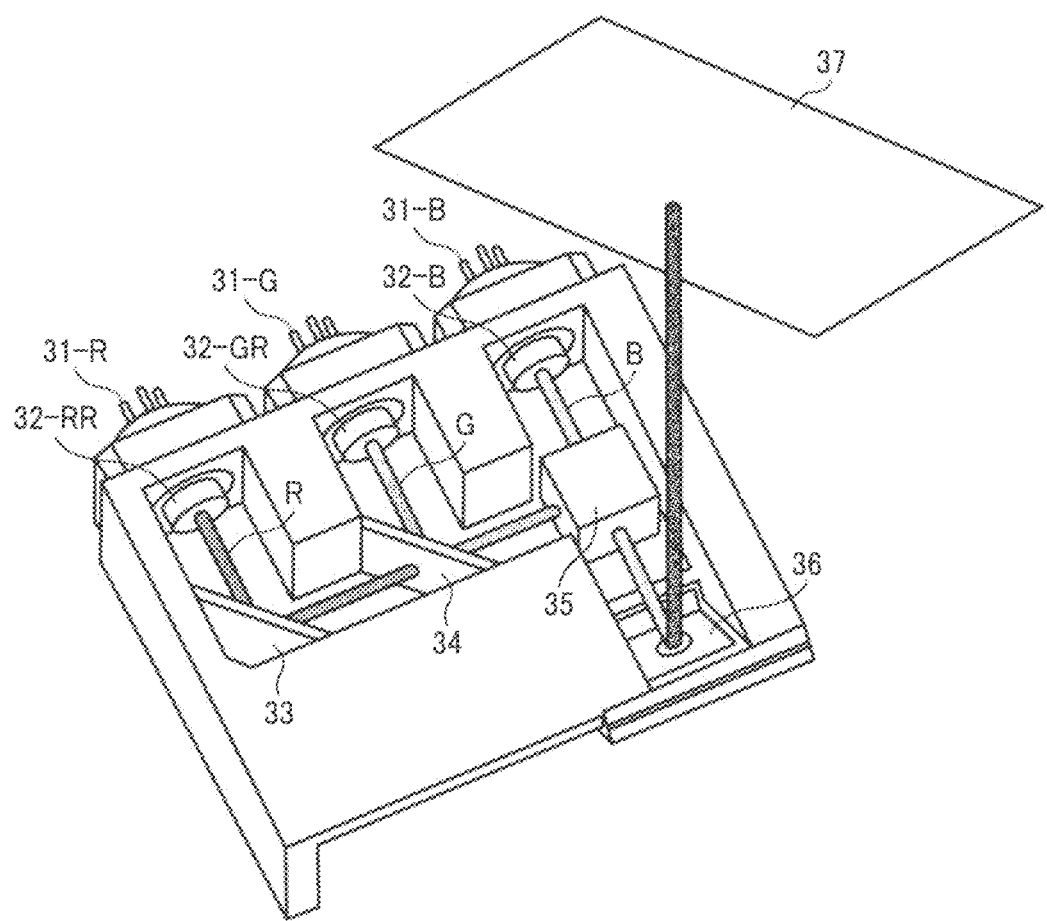
FIG. 11 is a schematic diagram illustrating the image projection device of FIG. 10(b).

Referring now to FIGS. 6A and 6B, there are provided schematic diagrams illustrating a third conventional example of steps of a silicon process when using a single Si substrate (see FIG. 11 of JP-2009-222900-A). It is to be noted that the PZT process is similar to that shown in FIG. 3. Thus, the description thereof is omitted.

The basic fabrication method is similar to, if not the same as that of the first conventional example, except that the number of silicon etching process is increased to 3 times and the process becomes relatively complicated. It is to be noted that an aluminum mask is employed as an etching mask in this example.

In this example, isotropic etching is performed in the third Si etching, thereby forming the end portion of the cantilever to have a curved shape in the thickness direction (downwardly curvilinear).

If there is a sizing problem with overgrown side-etching, high anisotropic etching may be performed at first and then the isotropic etching may be performed for the last part of the third etching process.

Such a configuration can reduce concentration of the tensile stress, thereby preventing the cantilever from breaking. However, there is a drawback in this configuration that the amount of etching for fabricating the torsion beam and the cantilever increases (torsion beam: 300 μm, cantilever: 370 μm), causing the thickness thereof to vary due to etching.

As described above, the variation of the thickness of the torsion beam causes unstable vibration, more particularly, changes in the resonant frequency. As a result, variation in the resonant frequency complicates drive control and increases the cost of the drive circuit.

In view of the above, the present invention provides a method and apparatus for suppressing variation of the resonant frequency and fabricating a cantilever that does not break easily.

Embodiment 1

With reference to FIGS. 7 through 10, a description is provided of steps of fabrication of a microscanner according to a first illustrative embodiment of the present invention. FIGS. 7(1) through (5) illustrate steps of a PZT process which is similar to, if not the same process explained in FIGS. 3(1) through (5), except for the use of the SOI substrate. The torsion beam with a thickness of 100 μm and the cantilever with a thickness of 30 μm are fabricated on an active layer with a thickness of 100 μm.

Figure 8B:
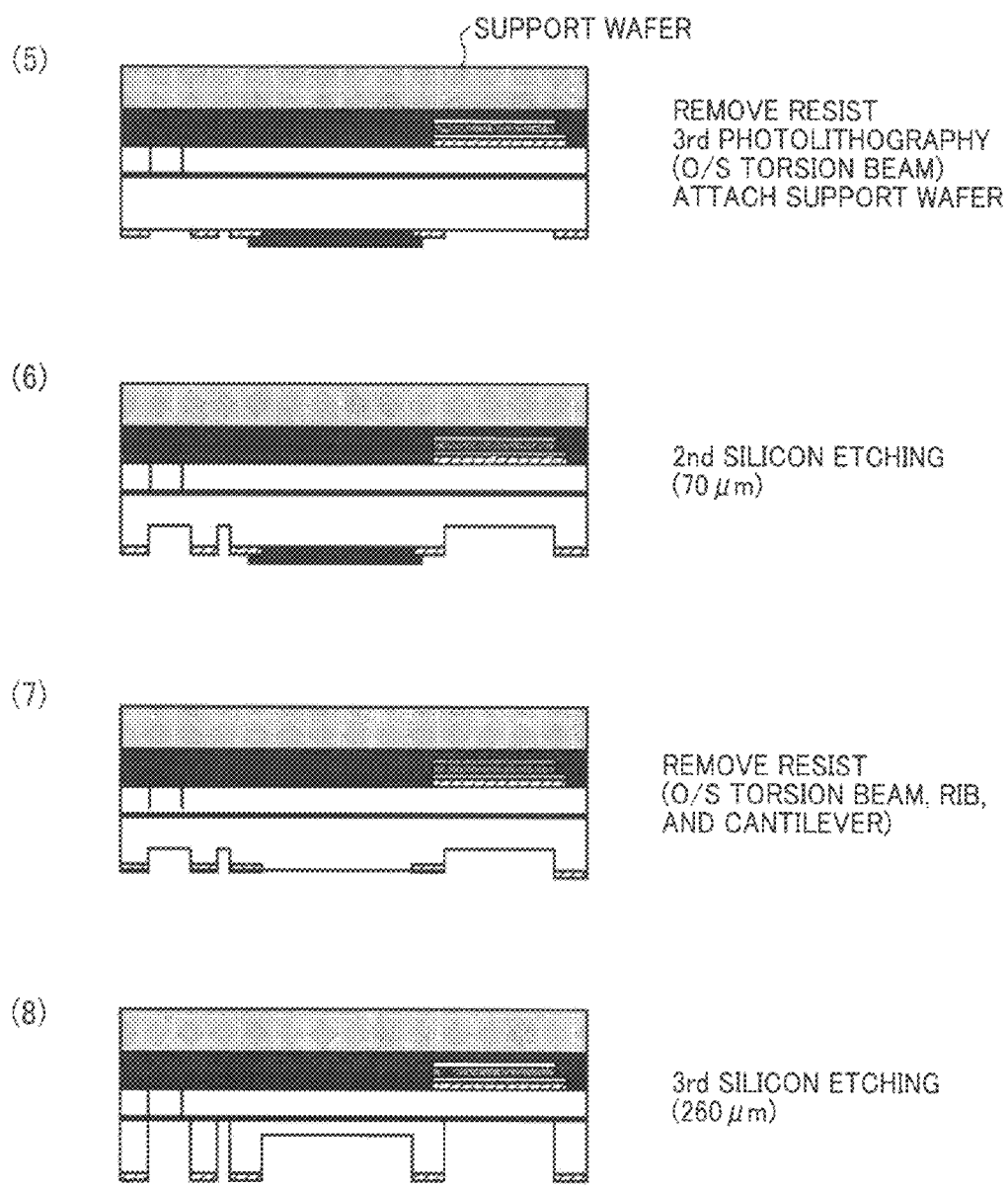

FIGS. 8A through 8C illustrate steps of the SOI process according to the first illustrative embodiment.

The basic fabrication method is similar to, if not the same as that of the first conventional example explained in FIGS. 4(1) through (5), except that Si etching is performed four times (FIGS. 8A(4), 8B(6), 8B(8), and 8C(10)) to fabricate accurately the mirror portion with the rib with a thickness of 400 μm, the torsion beam with a thickness of 100 μm, and the cantilever with a thickness of 30 μm.

According to the first illustrative embodiment, a condition for the fourth Si etching is different from the conventional process. Using isotropic etching (for example, parallel plate type RIE of which the anisotropic aspect is not so high, and a condition using only etching gas), the end portion of the cantilever is curved in the thickness direction (FIG. 8C(10)).

If substantially isotropic etching is performed for 70 μm, then a curve having a curvature radius R of 70 μm (R=70 μm) is obtained at the end of the etching mask, that is, the end portion of the cantilever. It is desirable to obtain the radius R equal to or greater than 10 μm, rather than a few μm that can not be avoidable in a normal process.

It is to be noted that, in FIG. 8C(12), the lower pad electrode is formed at the right end portion (a step portion where a height is different) of the lower electrode where the frame is thick. The upper pad electrode is formed at the upper electrode indicated by A' in FIG. 8C(12).

According to the first illustrative embodiment, as illustrated in FIG. 8C(12), the SOI substrate includes three layers: an Si substrate, an oxide film, and another Si substrate. The cantilever and the torsion beam are fabricated on the same Si substrate. Furthermore, the thickness of the torsion beam is the same as that of the Si substrate. The cantilever is configured thinner than the torsion beam, thereby facilitating oscillation of the cantilever and thus enabling the mirror portion to swing at a large angle.

With this configuration, variation of the thickness of the torsion beam due to etching is reduced, if not prevented entirely, thereby suppressing or preventing variation of the resonant frequency.

According to the illustrative embodiment, there is no dissimilar material such as the oxide film as illustrated in FIG. 5 in the connecting portion between the cantilever and the torsion beam. Accordingly, the cantilever is prevented from breaking easily. To strengthen the cantilever even more, it is desirable that the end portions of the cantilever connecting to the torsion beam and the frame have a thickness distribution of maximum thickness.

According to the illustrative embodiment described above, when implemented in the microscanner, the cantilever which does not break easily can prevent variation of the resonant frequency. When such a microscanner is employed in an optical scanning device, a deflection mirror is enable to swing at a desired large swing angle without changing undesirably the resonant frequency.

Embodiment 2

Figure 9:
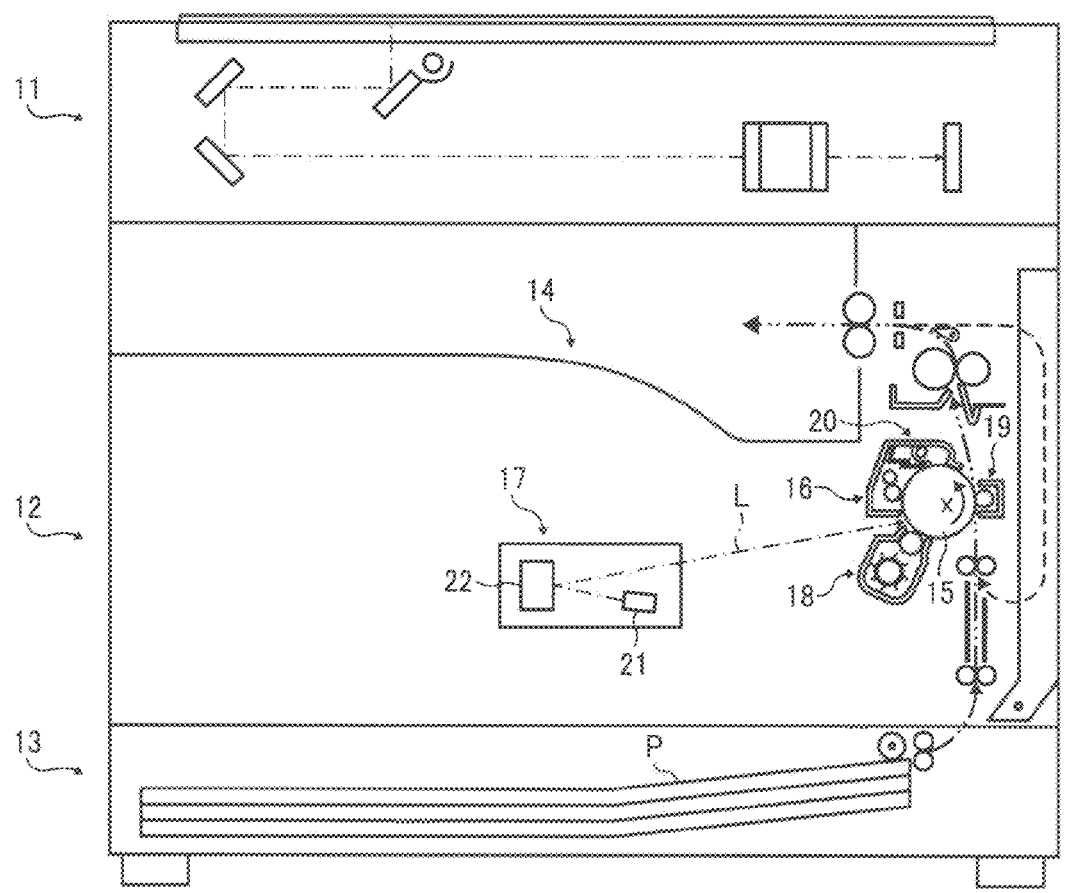
FIG. 9 is a schematic diagram illustrating an image forming apparatus employing an optical scanning device of the present invention.

Referring now to FIG. 9, there is provided a schematic diagram illustrating an image forming apparatus employing the optical scanning device according to the illustrative embodiment.

In FIG. 9, the image forming apparatus includes a document reading unit 11, an image forming unit 12, a sheet feeding unit 13, and a sheet discharge tray 14. The image forming unit 12 includes a photoreceptor drum 15, a charging device 16, a writing unit 17, a developing device 18, a transfer device 19, and a cleaning device 20.

The charging device 16 charges the surface of the photoreceptor drum 15. The writing unit 17 scans the surface of the photoreceptor drum 15 with a light beam L based on image information corresponding to the image to be formed, thereby forming an electrostatic latent image on the surface of the photoreceptor drum 15. The developing device 18 develops the electrostatic latent image formed on the photoreceptor drum 15 with toner into the visible image, also known as a toner image. The transfer device 19 transfers the toner image onto a recording medium. The cleaning device 20 removes and collects toner remaining on the surface of the photoreceptor drum 15 after a transfer process by the transfer device 19.

The writing unit 17 includes a semiconductor laser 21 and an optical scanning device 22 according to the illustrative embodiment. The semiconductor laser 21 serves as a light source for the light beam that illuminates the photoreceptor drum 15 in accordance with the image information of the document. The optical scanning device 22 reflects the light beam L from the semiconductor laser 21 and focuses the light beam L on the surface of the photoreceptor drum 15.

Embodiment 3

With reference to FIGS. 10 and 11, a description is provided of an image projection device using a two-axis microscanner that deflects light in two directions. By contrast, according to EMBODIMENT 1 and EMBODIMENT 2, the microscanner deflects light in one direction. With the application of the similar configuration, the two-axis microscanner deflecting light in two directions is formed and implemented in the image projection device according to EMBODIMENT 3.

FIG. 10(a) is a schematic diagram illustrating the two-axis microscanner. The two-axis microscanner includes a first torsion beam 1 and a second torsion beam 9. The first torsion beam 1 and the second torsion beam 9 oscillate in directions perpendicular to each other, thereby deflecting light in two directions.

Referring now to FIGS. 10(b) and 11, a description is provided of the image projection device employing the two-axis microscanner. FIG. 10(b) is a conceptual diagram of the image projection device employing the two-axis microscanner of FIG. 10(a). FIG. 11 is a schematic diagram illustrating the image projection device.

As illustrated in FIG. 11, light sources 31R, 31G, and 31B that project light beams of red (R), green (G), and blue (B), respectively, with three different wave lengths are installed in a housing of the image projection device. Substantially near the end portion of the light sources 31R, 31G, and 31B from which the light beams are projected, a collimating optical system including focus lenses 32R, 32G, and 32B are disposed.

The focus lenses 32R, 32G, and 32B focus light projected from each one of respective light sources 31R, 31G, and 31B into substantially parallel light. The substantially parallel light of red, green, and blue is synthesized by a synthesizing prism 35 through a mirror 33 and a half mirror 34, and incidents upon the mirror surface of a light deflector 36.

The light deflector 36 employs a light deflector (two-dimensional reflection-angle changeable mirror) that deflects light in two axial directions. The synthesized light beam entering the mirror surface of the light deflector 36 is deflected two-dimensionally by the light deflector 36 and projected against a projection surface 37, thereby projecting an image. It is to be noted that the light beams with three wave length and the synthesizing prism are omitted in FIG. 10(b).

As illustrated in FIG. 10(b), an image generator 41 generates an image signal in accordance with the image information. Then, the image signal is sent to a light source drive circuit 43 through a modulator 42 while an image synchronizing signal is sent to a scanner drive circuit 44. The scanner drive circuit 44 provides a drive signal to the light deflector 36 in accordance with the image synchronizing signal.

The drive signal causes the mirror portion 4 of the light deflector 36 to oscillate sympathetically in two perpendicular directions at a predetermined angle, for example, 10 degrees. In the meantime, the intensity of the light beam projected from the light source 31 is modulated by the light source drive circuit 43 in a timing at which the light deflector 36 deflect two-dimensionally the light beam. Accordingly, a two-dimensional image information is projected against the projection surface 37.

The intensity may be modulated by modulating the pulse width. Alternatively, the amplitude may be modulated. The modulator 42 conducts pulse width modulation or amplitude modulation on the image signal. The light source drive circuit 43 modulates the modulated signal into an electric current that enables the light source 31 to operate.

According to the illustrative embodiments described above, when implemented in the image forming apparatus, power consumption and noise are significantly reduced, compared with a conventional polygon mirror. Further, when implemented in the image projection device, the mirror can swing at a large angle while achieving low power consumption, a wide view angle, and good drive efficiency.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanning device, comprising:
   a substrate having a three-layer structure including an oxide film sandwiched between two silicon substrates;
   a frame;
   a torsion beam to swingably support a mirror portion, the mirror portion deflecting a light beam projected from a light source; and
   a cantilever supported by the frame, to connect to the torsion beam and apply torque to the torsion beam, the cantilever and the torsion beam formed on the same silicon substrate, the cantilever having a thickness substantially thinner than the thickness of the torsion beam, and the cantilever having a substantially curvilinear thickness distribution on a side of the cantilever adjacent to the oxide film, the thickness of the cantilever being smallest at a portion that is farthest from the oxide film in a thickness direction of the cantilever.

2. The optical scanning device according to claim 1, wherein an end portion of the cantilever that extends from the torsion beam is curved in a thickness direction of the cantilever.

3. An image forming apparatus for forming an image, comprising:
   an optical scanning device;
   an image bearing member scanned by the optical scanning device to form an electrostatic latent image on a surface of the image bearing member;
   a developing device to develop the electrostatic latent image with toner to form the electrostatic latent image into a toner image also known as a visible image; and
   a transfer device to transfer the toner image onto a recording medium,
   the optical scanning device including
   a substrate having a three-layer structure including an oxide film sandwiched between two silicon substrates;
   a frame;
   a torsion beam to swingably support a mirror portion, the mirror portion deflecting a light beam projected from a light source; and
   a cantilever supported by the frame, to connect to the torsion beam and apply torque to the torsion beam, the cantilever and the torsion beam formed on the same silicon substrate, the cantilever having a thickness substantially thinner than the thickness of the torsion beam, and the cantilever having a substantially curvilinear thickness distribution on a side of the cantilever adjacent to the oxide film, the thickness of the cantilever being smallest at a portion that is farthest from the oxide film in a thickness direction of the cantilever.

4. The image forming apparatus according to claim 3, wherein an end portion of the cantilever that extends from the torsion beam is curved in a thickness direction of the cantilever.

5. An image projection device for projecting an image against a projection surface, comprising:
   a light source to project light;
   an collimating optical system to form diffused light projected from the light source into substantially parallel light; and
   a modulator to modulate the light projected from the light source in accordance with an image signal; and
   an optical scanning device including
   a substrate having a three-layer structure including an oxide film sandwiched between two silicon substrates;
   a frame;
   a torsion beam to swingably support a mirror portion, the mirror portion deflecting a light beam projected from a light source; and
   a cantilever supported by the frame, to connect to the torsion beam and apply torque to the torsion beam, the cantilever and the torsion beam formed on the same silicon substrate, the cantilever having a thickness substantially thinner than the thickness of the torsion beam, and the cantilever having a substantially curvilinear thickness distribution on a side of the cantilever adjacent to the oxide film, the thickness of the cantilever being smallest at a portion that is farthest from the oxide film in a thickness direction of the cantilever.

6. The image projection device according to claim 5, wherein an end portion of the cantilever that extends from the torsion beam is curved in a thickness direction of the cantilever.

* * * * *